United States Patent

Pfaendtner et al.

(10) Patent No.: US 6,497,920 B1
(45) Date of Patent: Dec. 24, 2002

(54) PROCESS FOR APPLYING AN ALUMINUM-CONTAINING COATING USING AN INORGANIC SLURRY MIX

(75) Inventors: Jeffrey Allan Pfaendtner, Blue Ash, OH (US); Joseph David Rigney, Milford, OH (US); Nripendra Nath Das, West Chester, OH (US); Michael James Weimer, Loveland, OH (US); John Lewis Lackman, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/656,287

(22) Filed: Sep. 6, 2000

(51) Int. Cl.⁷ .............................. B05D 3/02; B05D 7/22
(52) U.S. Cl. ...................... 427/235; 427/229; 427/230; 427/376.6; 427/376.8; 427/380; 427/383.1; 427/383.7
(58) Field of Search ................................ 427/229, 235, 427/230, 380, 376.6, 383.1, 376.8, 383.7

(56) References Cited

U.S. PATENT DOCUMENTS

| | | | | |
|---|---|---|---|---|
| 3,779,719 A | * | 12/1973 | Clark et al. ................... 29/197 |
| 3,801,357 A | * | 4/1974 | Baldi .................... 117/107.2 P |
| 3,950,575 A | * | 4/1976 | Kitayama et al. ............ 427/226 |
| 4,820,362 A | * | 4/1989 | Baldi ............................ 149/2 |
| 5,366,765 A | * | 11/1994 | Milaniak et al. ............. 427/229 |
| 5,807,428 A | * | 9/1998 | Bose et al. ............... 106/14.44 |
| 5,824,366 A | | 10/1998 | Bose et al. .................. 427/239 |

OTHER PUBLICATIONS

Data Sheet on Bentone® AD, Rheox, Inc. (2 pages) 1993.
Data Sheet on Bentone® MA, Rheox, Inc. (1 page) 1993.

* cited by examiner

*Primary Examiner*—Michael Barr
(74) *Attorney, Agent, or Firm*—David L. Narciso; Gregory O. Garmong

(57) ABSTRACT

An internal passage of an article such as a gas turbine airfoil is coated with an aluminum-containing coating. To accomplish this coating process, a coating slurry of a mixture of a carrier component of water and a hectorite clay or a bentonite clay, together with a solids component of a source of aluminum, a halide activator, and an oxide dispersant, is prepared. The coating slurry is applied to the internal passage of the gas turbine airfoil and dried. The gas turbine airfoil and the applied coating slurry are heated to form an aluminum-containing coating bonded to the internal passage of the gas turbine airfoil. Excess coating material is removed from the article internal passage.

19 Claims, 3 Drawing Sheets

PROCESS FOR APPLYING AN ALUMINUM-CONTAINING COATING USING AN INORGANIC SLURRY MIX

FIELD OF THE INVENTION

This invention relates to the application of an aluminum-containing coating on a surface, and in particular, to the application of such a coating from an aluminum-containing slurry onto the internal surfaces of a gas turbine airfoil.

BACKGROUND OF THE INVENTION

In an aircraft gas turbine (jet) engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against an airfoil section of the turbine blades and vanes, which turns the shaft and provides power to the compressor and fan. In a more complex version of the gas turbine engine, the compressor and a high pressure turbine are mounted on one shaft, and the fan and low pressure turbine are mounted on a separate shaft. In any event, the hot exhaust gases flow from the back of the engine, driving it and the aircraft forwardly.

The hotter the combustion and exhaust gases, the more efficient is the operation of the jet engine. There is thus an incentive to raise the combustion and exhaust gas temperatures. The maximum temperature of the combustion gases is normally limited by the materials used to fabricate the turbine vanes and turbine blades of the turbine, upon which the hot combustion gases impinge. In current engines, the turbine vanes and blades are made of nickel-based superalloys, and can operate at temperatures of up to about 1900–2150° F.

Many approaches have been used to increase the operating temperature limits of the airfoil portions of turbine blades and vanes to their current levels. For example, the composition and processing of the base materials themselves have been improved, and a variety of solidification techniques have been developed to take advantage of oriented grain structures and single-crystal structures.

Physical cooling techniques may also be used. In one technique, internal cooling passages are present in the interior of the turbine airfoil. Air is forced through the cooling passages and out openings at the external surface of the airfoil, removing heat from the interior of the airfoil and, in some cases, providing a boundary layer of cooler air at the surface of the airfoil.

The surfaces of the internal cooling passages may be protected with a diffusion aluminide coating, which oxidizes to an aluminum oxide protective scale that inhibits further oxidation of the internal surfaces. A number of techniques for applying the internal diffusion aluminide coating are known, including chemical vapor deposition, vapor-phase aluminiding, and above-the-pack techniques. These approaches have the drawback that they also coat other exposed surfaces. Surfaces which are not to be coated may sometimes be protected by masking, but masking may not be practical in many circumstances.

In another technique, a slurry coating containing a source of aluminum and other components is applied to the internal surface. The slurry coating is chemically reacted to deposit aluminum on the internal surface. Slurry coating has the advantage that the spatial extent of the aluminum-containing coating may be limited to specific areas such as the internal surfaces. However, existing slurry coating techniques have the drawback they may leave undesirable contamination on the blade in the form of decomposition by-products.

There is therefore a need for an improved approach to the depositing of aluminum-containing coatings on specific areas of surfaces, particularly the internal surfaces of articles such as gas turbine airfoils. The present invention fulfills this need, and further provides related advantages.

BRIEF SUMMARY OF THE INVENTION

The present invention provides a slurry-based approach for coating surfaces of articles with an aluminum-containing coating. It is particularly well suited for coating the internal surfaces of articles, such as the internal surfaces of the passages within hollow airfoils of gas turbine blades and vanes. The present approach has the advantages of conventional slurry-coating processes. Additionally, the slurry is formulated to facilitate the removal of residual, excess coating material from the surfaces following the coating procedure.

A method of coating comprises the steps of providing an article having an article surface to be coated, and providing a coating slurry comprising a mixture of a carrier component comprising water and an inorganic gel former, a source of aluminum, optionally a halide activator, and an oxide dispersant. The inorganic gel former is preferably a swelling clay such as a montmorillonite clay, and most preferably a hectorite clay or a bentonite clay. The coating slurry is applied to the article surface and thereafter dried on the article surface to remove the water therefrom. The step of drying is preferably accomplished by heating the coating slurry on the article surface to a temperature of from about 180° F. to about 950° F., most preferably from about 180° F. to about 250° F., in air, for a time of from about 2 to about 48 hours. The method further includes heating the article surface with the dried coating slurry thereon to form an aluminum coating bonded to the article surface. The heating is preferably accomplished by heating to a temperature of from about 1700° F. to about 2100° F. for a time of from about 1 to about 16 hours, in an inert or reducing atmosphere. Optionally but desirably, the excess coating material is thereafter removed from the article surface.

The article is preferably an airfoil of a gas turbine blade or vane. In one case, the airfoil is hollow with internal passages therethrough. The step of applying is accomplished by injecting the coating slurry into and filling the internal passage of the article.

The source of aluminum is preferably aluminum, a chromium-aluminum alloy, a cobalt-aluminum alloy, a titanium-aluminum alloy, an iron-aluminum alloy, an aluminum-vanadium alloy, an aluminum-manganese alloy, or mixtures thereof. The halide activator, when used, is preferably $AlF_3$, $NH_4F$, $AlCl_3$, $NH_4Cl$, $CrCl_3$, $CrCl_2$, $NaCl$, $FeCl_2$, $FeCl_3$, $CrF_2$, $CrF_3$, or mixtures thereof. The oxide dispersant is preferably alumina, but other oxides such as yttria, zirconia, chromia, and hafnia, and mixtures thereof, may be used.

Preferably, the source of aluminum is from about 1 to about 50 percent by weight of the total weight of the source of aluminum, the halide activator, and the oxide dispersant; the halide activator is from about 0.5 to about 10 percent by weight of the total weight of the source of aluminum, the halide activator, and the oxide dispersant; and the oxide dispersant is from about 50 to about 99 percent by weight of the total weight of the source of aluminum, the halide activator, and the oxide dispersant. Most preferably, the source of aluminum is a cobalt-aluminum alloy having about 50 percent by weight cobalt, balance aluminum, present in an amount of from about 28 to about 35 weight percent of the total weight of the source of aluminum, the halide activator, and the oxide dispersant. Most preferably, the halide activator is $AlF_3$, present in an amount of from about 4 to about 6 percent by weight of the total weight of the source of aluminum, the halide activator, and the oxide dispersant. The inorganic gel former is from about 1 to about 6 percent by weight of the total weight of the water and the inorganic gel former. The source of aluminum, the halide activator, and the oxide dispersant together constitute from about 30 to about 70 percent by weight of the mixture of the carrier component, the source of aluminum, the halide activator, and the oxide dispersant.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
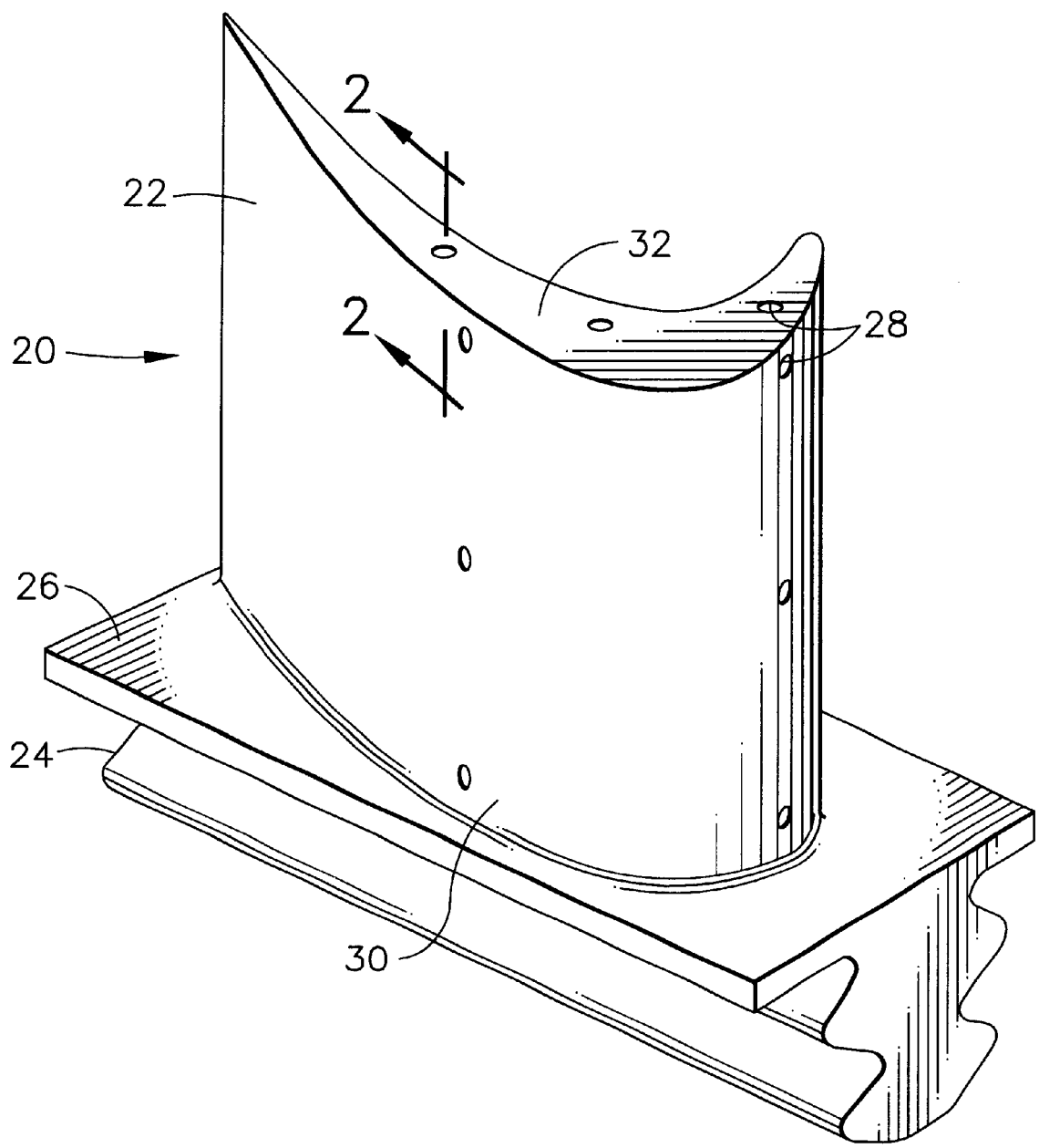
FIG. 1 is a perspective view of a turbine blade.

FIG. 1 depicts a component article of a gas turbine engine such as a turbine blade or turbine vane, and in this illustration a turbine blade 20. The turbine blade 20 is formed of any operable material, but is preferably a nickel-base superalloy. The turbine blade 20 includes an airfoil section 22 against which the flow of hot exhaust gas is directed. (The turbine vane has a similar appearance in respect to the pertinent airfoil section, but typically includes other end structure to support the airfoil.) The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 is joined to the dovetail 24. A number of internal passages extend through the interior of the airfoil 22, ending in openings 28 in the surface of the airfoil 22. During service, a flow of cooling air is directed through the internal passages to reduce the temperature of the airfoil 22. The airfoil 22 may be described as having a root end 30 adjacent to the dovetail 24, and an oppositely disposed tip end 32 remote from the dovetail 24.

Figure 2:
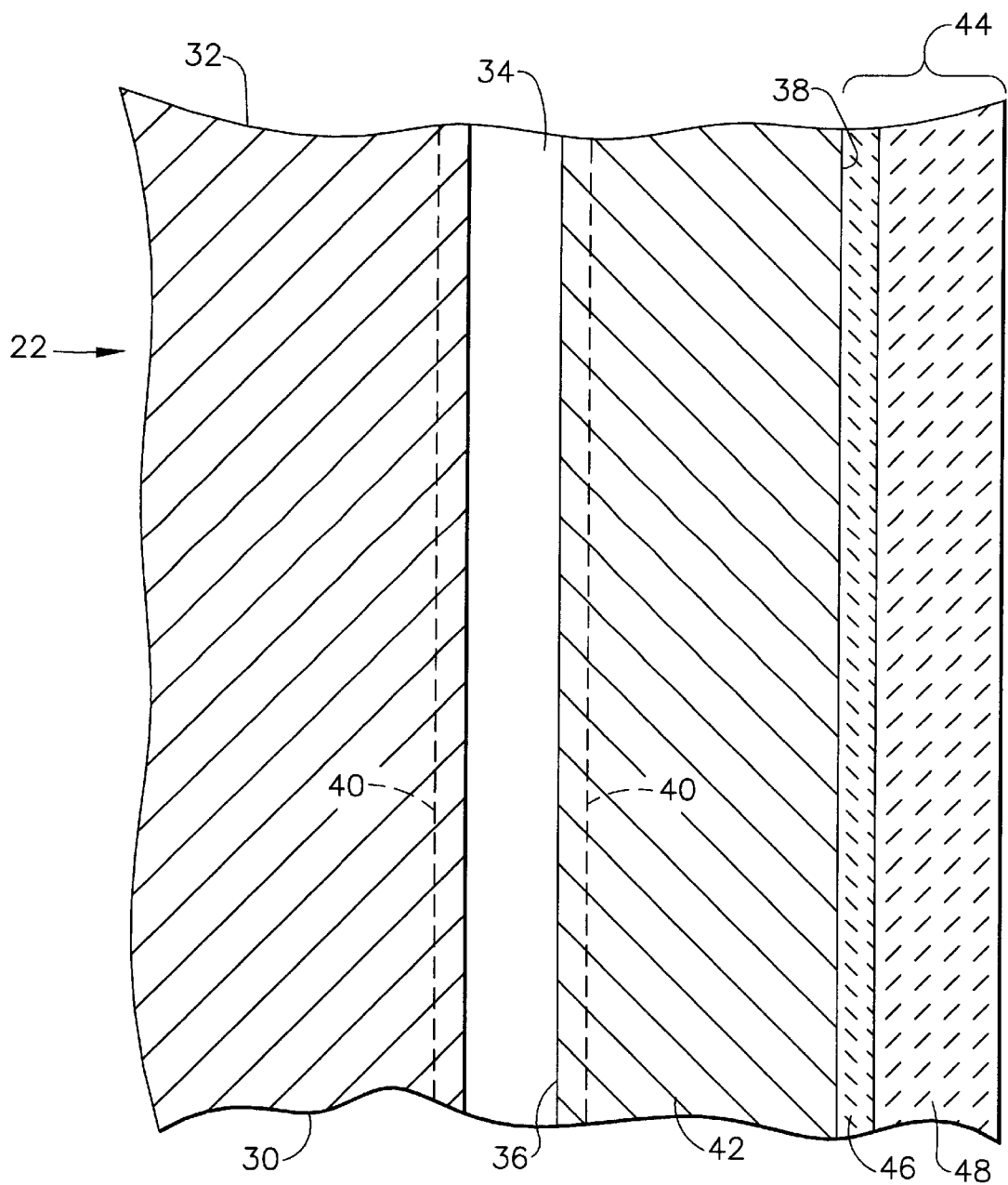
FIG. 2 is an enlarged schematic sectional view through the turbine blade of FIG. 1, taken on lines 2—2.

FIG. 2 is a longitudinal section through the airfoil 22, showing one of the internal passages 34 extending through an interior of the airfoil 22. The internal passage 34 has an internal airfoil surface 36, and there is also an external airfoil surface 38 of the metallic portion of the airfoil 22.

A diffusion aluminide protective region 40 is present at the internal airfoil surface 36. The diffusion aluminide is formed by depositing an aluminum-containing coating onto the internal airfoil surface 36, so that a body of the airfoil 22 serves as a substrate 42. The aluminum is interdiffused with the material of the substrate 42 to form the aluminum-enriched protective region 40 lying below the internal airfoil surface 36. The diffusion aluminide protective region 40 has a composition with the aluminum concentration highest near the internal airfoil surface 36, and decreasing aluminum concentration with increasing distance into the substrate 42 from the internal airfoil surface 36. The diffusion aluminide protective region 40 is typically from about 0.0005 to about 0.005 inch thick. When exposed to a high-temperature oxidizing environment, the aluminum-enriched region at the internal airfoil surface 36 oxidizes to form a highly adherent aluminum oxide ($Al_2O_3$) protective scale at the internal airfoil surface 36, inhibiting and slowing further oxidation damage. Reactive and noble aluminide-modifying elements such as hafnium, zirconium, yttrium, silicon, titanium, tantalum, tungsten, molybdenum, rhenium, ruthenium, cobalt, chromium, platinum, and palladium, and combinations thereof, may optionally be present in the diffusion aluminide protective region 40. An overlay coating such as discussed next and applied to the external airfoil surface 38 is not used on the internal airfoil surface 36.

The external airfoil surface 38 may also be protected, and FIG. 2 illustrates one approach. A protective coating 44 overlies and contacts the external airfoil surface 38. The protective coating 44 has a protective layer 46 overlying and contacting the external airfoil surface 38. The protective layer 46 is preferably formed of a diffusion aluminide or an overlay composition. When used, the diffusion aluminide may be a simple diffusion aluminide of the type discussed earlier, or a modified diffusion aluminide such as a platinum aluminide. Such coatings are known in the art for the case of external protective layers 46. When used, the overlay protective coating is preferably of the MCrAlX type. The terminology "MCrAlX" is a shorthand term of art for a variety of families of overlay protective layers 46 that may be employed as environmental coatings or bond coats in thermal barrier coating systems. In this and other forms, M refers to nickel, cobalt, iron, and combinations thereof. In some of these protective coatings, the chromium may be omitted. The X denotes elements such as hafnium, zirconium, yttrium, tantalum, rhenium, ruthenium, palladium, platinum, silicon, titanium, boron, carbon, and combinations thereof. Specific compositions are known in the art. Some examples of MCrAlX compositions include, for example, NiAlCrZr and NiAlZr, but this listing of examples is not to be taken as limiting. The protective layer 46 is from about 0.0005 to about 0.010 inch thick. Such protective layers 46 are generally known in the art.

Optionally, a ceramic layer 48 overlies and contacts the protective layer 46. The ceramic layer 48 is preferably yttria-stabilized zirconia, which is zirconium oxide containing from about 2 to about 12 weight percent, preferably from about 3 to about 8 weight percent, of yttrium oxide. The ceramic layer 48 is typically from about 0.003 inch to about 0.010 inch thick. Other operable ceramic materials may be used as well. When there is no ceramic layer 48 present, the protective layer 46 is termed an "environmental coating". When there is a ceramic layer 48 present, the protective layer 46 is termed a "bond coat".

Figure 3:
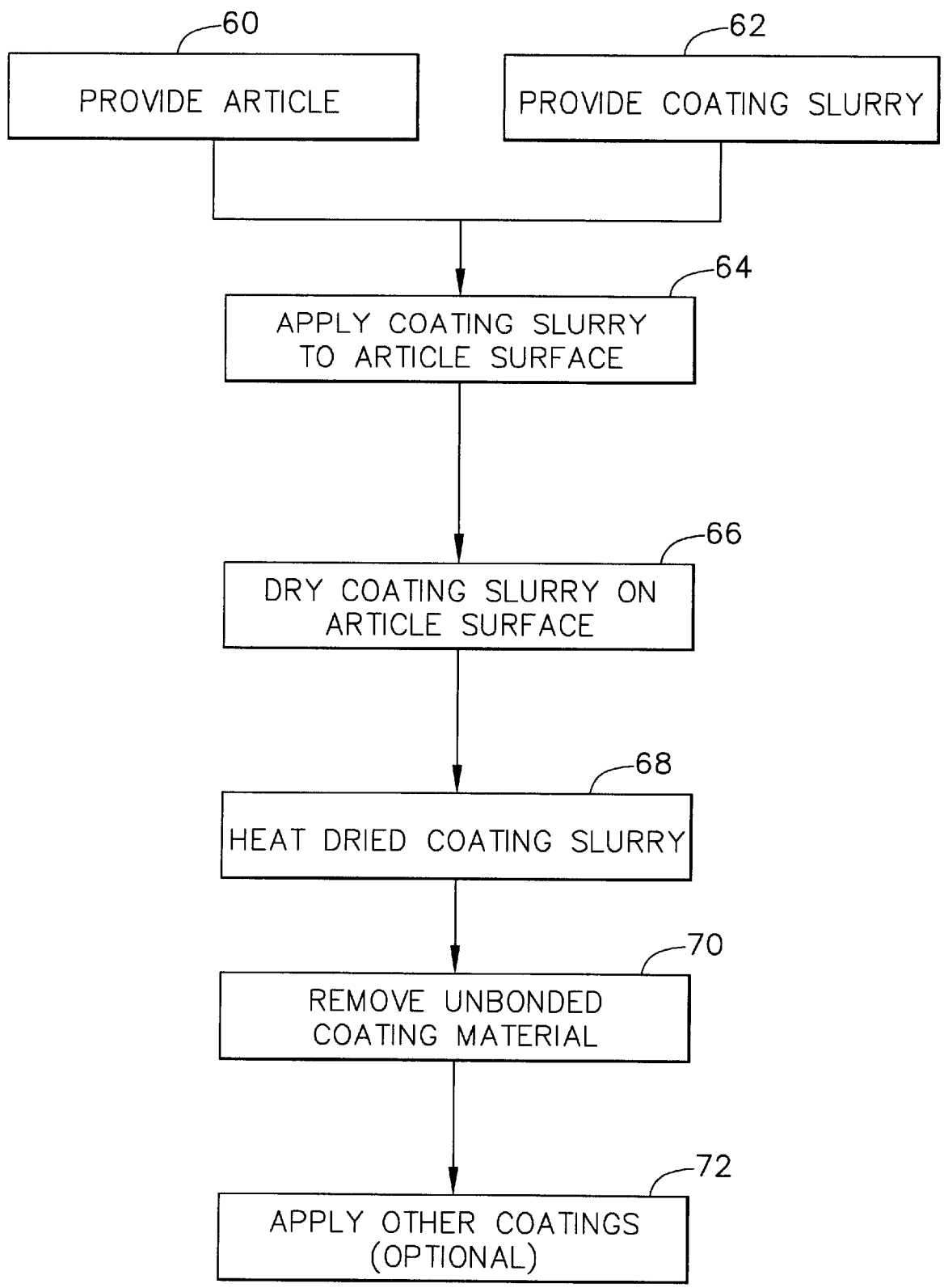
FIG. 3 is a block flow diagram of an approach for preparing an internally coated gas turbine airfoil.

FIG. 3 depicts a preferred approach for practicing the present method. An article is provided, numeral 60, in this case an airfoil section 22 such as found in the turbine blade 20 or in a turbine vane.

A coating slurry is provided, numeral 62. The coating slurry includes a carrier component and a mixture of powders. The carrier component includes water and an inorganic gel former. A small amount of a highly and completely volatile organic compound such as an alcohol may be mixed with the water to aid in evaporating the water in a later step. The inorganic gel former is preferably a swelling clay, more preferably a montmorillonite clay, and most preferably a hectorite clay or a bentonite clay. Hectorite clay is the most efficient gel former, as it absorbs up to about 24 times their initial weight of water, and is preferred to bentonite clay, which absorbs up to about 16 times its initial weight of water. Hectorite clay is a NaMgLi-silicate clay, with particles typically in the form of elongated platelets that are nominally about 0.8 by about 0.08 by about 0.001 micrometers in dimensions. The most preferred clay for use with the present approach is Bentone$^R$ AD clay, which is a hectorite clay available from Rheox, Inc., Hightstown, N.J. Bentone$^R$ MA clay, also available from Rheox, Inc., may be used, but it is slightly coarser than the Bentone$^R$ AD clay, with the result that the Bentone$^R$ AD clay has better antisettling properties and is a better gel former. In the second class of preferred clays, bentonite clay is a NaAlMg-silicate clay, with particles typically in the form of square platelets that are nominally about 0.8 by about 0.8 by about 0.001 micrometers in dimensions.

The inorganic gel former is preferably from about 1 to about 6 (most preferably 4) percent by weight of the total weight of the water and the inorganic gel former. The inorganic gel former is mixed with the water to form the carrier component. Mixing is accomplished using a high-shear or high-speed mixer, such as a conventional household blender.

A "solids" component includes a powdered source of aluminum, optionally a powdered halide activator, and a powdered oxide dispersant. (These ingredients are termed the "solids" component, even though the inorganic gel former is also a solid and is included in the carrier component.) The source of aluminum is preferably aluminum, a chromium-aluminum alloy, a cobalt-aluminum alloy, a titanium-aluminum alloy, an iron-aluminum alloy, an aluminum-vanadium alloy, an aluminum-manganese alloy, or mixtures thereof. A cobalt-aluminum alloy having about 50 percent by weight cobalt, balance aluminum, is preferred. The coating may be accomplished without the use of a halide activator if a sufficiently high level (about 50–80 percent by weight of the solids component) of the source of aluminum is used. However, the use of the halide activator is preferred, both because the source of aluminum may be present in a smaller concentration and because the halide activator aids in the subsequent cleaning step to facilitate the removal of excess coating material. The halide activator, when used, is preferably AlF$_3$, NH$_4$F, AlCl$_3$, NH$_4$Cl, CrCl$_3$, CrCl$_2$, NaCl, FeCl$_2$, FeCl$_3$, CrF$_2$, CrF$_3$ mixtures thereof. AlF$_3$ is preferred. The oxide dispersant is preferably aluminum oxide, Al$_2$O$_3$, but other oxides such as yttria, zirconia, chromia, and hafnia may instead be used. The preferred mesh size of the solids component is from about 150 mesh to about 325 mesh. The source of aluminum is preferably from about 1 to about 50, more preferably from about 28 to about 35 and most preferably about 30, percent by weight of the total weight of the source of aluminum, the halide activator, and the oxide dispersant; the halide activator is from about 0.5 to about 10, more preferably from about 2 to about 6 and most preferably about 5, percent by weight of the total weight of the source of aluminum, the halide activator, and the oxide dispersant; and the oxide dispersant is from about 50 to about 99 percent by weight of the total weight of the source of aluminum, the halide activator, and the oxide dispersant.

The carrier component and the solids component are mixed together to form the coating slurry. The source of aluminum, the halide activator, and the oxide dispersant taken together are from about 30 to about 70, most preferably about 40, percent by weight of the total mixture of the carrier component, the source of aluminum, the halide activator, and the oxide dispersant. The source of aluminum, the halide activator, and the oxide dispersant are mixed together in a blender, and then this solids component is mixed into the carrier component by hand with a spatula.

The coating slurry is applied to the article surface of interest, numeral 64. In the preferred case where the slurry is applied to the internal airfoil surfaces 36 of the internal passages 34, the slurry is injected into the internal passages 34 with a syringe and a pump.

The coating slurry applied to the surface is dried, numeral 66. In a preferred case, the drying step 66 is accomplished by heating the coating slurry on the article surface to a temperature of from about 180° F. to about 950° F. in air, for a time of from about 2 to about 48 hours. The drying evaporates the water of the coating slurry. A small amount of an evaporation aid such as alcohol may be added to the water to aid the evaporation. The evaporation aid evaporates completely, leaving no organic residue in the dried coating.

The dried coating slurry is heated to deposit an aluminum-containing coating onto the surface of the article, numeral 68. This heating step is preferably accomplished at a temperature of from about 1700° F. to about 2100° F. for a time of from about 1 to about 16 hours, in an inert (e.g., argon) or reducing (e.g., hydrogen) atmosphere. The article is desirably protected against oxidation by residual oxygen and water vapor during this step. It is preferred to wrap the article in nickel foil, or other foil such as stainless steel, tool steel, tantalum, or nickel-base superalloy metal, to provide this protection. In this heating step, an aluminum-containing vapor is produced by the source of aluminum and the halide activator. The aluminum-containing vapor deposits on the surface, leaving the aluminum-containing coating. The coated article is thereafter cooled to room temperature.

The result of the heating step 68 is the article surface with the aluminum-containing layer 40. The aluminum-containing layer 40 partially interdiffuses into the substrate 42 during the heating step 68.

Additionally, there is a residue on the surface, because only about 5–10 percent of the original solids powder is reacted. Tie residue includes the unreacted source of aluminum and the halide activator, the oxide dispersant, and the remaining inorganic gel former. This excess coating material is preferably removed, numeral 70. The removal is accomplished, even when in an internal passage, by blowing with high-pressure air or high-pressure running water.

Any other coatings are applied, numeral 72. In the case of the turbine airfoil, a coating such as the coating 44 or a thermal barrier coating may be applied over the external airfoil surface 38. Any operable process for the selected external coating may be used, and step 72 may follow, precede, or be concurrent with step 68. In the preferred approach whose result is illustrated in FIG. 2, the protective coating 44 is deposited overlying and contacting the external airfoil surface 38. The protective coating 44 includes the protective layer 46 deposited onto the external airfoil surface 38. The protective layer 46 is preferably is of the MCrAlX type. The protective layer 46 is deposited by any operable technique, such as physical vapor deposition (e.g., sputtering, cathodic arc, electron beam) or thermal spray. The protective layer 46 is preferably from about 0.0005 to about 0.010 inch, most preferably from about 0.002 to about 0.007 inch, thick.

The overlay protective coating optionally includes the ceramic layer 48, deposited overlying and contacting the protective layer 46. The ceramic layer 48 is preferably from about 0.003 to about 0.010 inch thick, most preferably about 0.005 inch thick. (FIG. 2 is not drawn to scale.) The ceramic layer 48 is preferably yttria-stabilized zirconia, which is zirconium oxide containing from about 2 to about 12 weight percent, preferably from about 3 to about 8 weight percent, of yttrium oxide. Other operable ceramic materials may be used as well. It may be deposited by any operable technique, such as physical vapor deposition or thermal spray.

The present approach has been reduced to practice.

In a first example, a solids component having a mixture of about 20 parts by weight of a cobalt-50 weight percent aluminum alloy, about 5 parts by weight of $AlF_3$, balance aluminum oxide was prepared. A carrier component of about 4 percent by weight of Bentonel$^R$ AD clay in water was prepared. About 40 parts by weight of the solids component and about 60 parts by weight of the carrier component were mixed together. The coating was injected into the internal passages of the airfoils of high pressure turbine blades. The airfbils were processed in the manner discussed above, by drying in air at 180° F. for 24 hours and heating in hydrogen at 1975° F. for 4 hours. The coating thickness was about 0.0011 inch and the aluminum content, as measured in the top 5 micrometers of the coating, was about 16 weight percent.

In a second example, the same approach as in the first example was followed, except that the cobalt-aluminum alloy in the solids component was increased to about 30 percent of the mixture and the coating thickness was 0.0015 inches. In this case, the aluminum content of the coating was about 22 weight percent. The second approach is preferred, due to the higher aluminum content of the coating.

A total of about 175 high pressure turbine blades were prepared by these approaches and variations thereof.

While the source of the advantages of the present approach are not known with certainty and the operability of the invention does not require such an understanding, it is believed that an origin of the difficulties with prior slurry-coating techniques is the organic gel-forming materials used in the slurry. The organic gel-forming materials are present to maintain the source of aluminum, the halide activator, and the oxide dispersant in suspension in the carrier component. The organic components may produce combustion by-product vapors during drying and/or heating, which can serve to retain the reaction residues on the surface of the article to inhibit or prevent their removal after the heating reaction step. The reaction products may also undesirably contaminate the coating.

The present approach achieves the gel-forming function using an inorganic material, preferably the hectorite clay or the bentonite clay. The use of an organic gel-forming or suspending agent is not within the scope of the present invention. In the present approach, the inorganic clay in the carrier component produces the gel characteristics, so that the other solids are retained in suspension as the coating slurry is applied to the article surface. There are no organic vapors resulting from the gel-forming ingredient. The use of clay has the additional benefit that clay gives up water more easily during the drying step than does an organic material, achieving more-complete and faster drying. The more-complete elimination of water is highly desirable because any residual water oxidizes the aluminum in the source of aluminum to aluminum oxide, causing its sintering and inhibiting the final removal of the excess coating material after the reaction. The presence of the water may thereby lead to the partial or complete blocking of the cooling holes in the airfoil by aluminum oxide, and the incidence of this undesirable effect is reduced with the present approach.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method of coating, comprising the steps of:
   providing an article having an article surface to be coated;
   providing a coating slurry comprising a mixture of
      a carrier component comprising water and an inorganic gel former,
      a source of aluminum, and
      an oxide dispersant;
   applying the coating slurry to the article surface; thereafter
   drying the coating slurry on the article surface to remove the water therefrom; and thereafter
   heating the article surface with the dried coating slurry thereon to form an aluminum-containing coating bonded to the article surface.

2. The method of coating of claim 1, wherein the coating slurry further includes
   a halide activator.

3. The method of coating of claim 2, wherein the source of aluminum is from about 1 to about 50 percent by weight of the total weight of the source of aluminum, the halide activator, and the oxide dispersant; the halide activator is from about 0.5 to about 10 percent by weight of the total weight of the source of aluminum, the halide activator, and the oxide dispersant; and the oxide dispersant is from about 50 to about 99 percent by weight of the total weight of the source of aluminum, the halide activator, and the oxide dispersant.

4. The method of coating of claim 1, including an additional step, after the step of heating, of
   removing excess coating material from the article surface.

5. The method of coating of claim 1, wherein the step of applying includes the step of
   injecting the coating slurry into an internal passage of the article.

6. The method of coating of claim 1, wherein the step of drying includes the step of
   heating the coating slurry on the article surface to a temperature of from about 180° F. to about 950° F. in air, for a time of from about 2 to about 48 hours.

7. The method of coating of claim 1, wherein the step of heating includes the step of
   heating the article surface with the dried coating slurry thereon to a temperature of from about 1700° F. to about 2100° F. for a time of from about 1 to about 16 hours, in an inert or reducing atmosphere.

8. The method of coating of claim 1, wherein the article surface is an internal passage of the article.

9. The method of coating of claim 1, wherein the inorganic gel former is a clay.

10. The method of coating of claim 1, wherein the inorganic gel former is a montmorillonite clay.

11. The method of coating of claim 1, wherein the inorganic gel former is selected from the group consisting of a hectorite clay and a bentonite clay, and mixtures thereof.

12. The method of coating of claim 1, wherein the source of aluminum is selected from the group consisting of aluminum, a chromium-aluminum alloy, a cobalt-aluminum alloy, a titanium-aluminum alloy, an iron-aluminum alloy, an aluminum-vanadium alloy, an aluminum-manganese alloy, and mixtures thereof.

13. The method of coating of claim 2, wherein the halide activator is selected from the group consisting of $AlF_3$, $NH_4F$, $AlCl_3$, $NH_4Cl$, $CrCl_3$, $CrCl_2$, $NaCl$, $FeCl_2$, $FeCl_3$, $CrF_2$, $CrF_3$, and mixtures thereof.

14. The method of coating of claim 1, wherein the oxide dispersant is selected from the group consisting of alumina, yttria, zirconia, chromia, and hafnia, and mixtures thereof.

15. The method of coating of claim 1, wherein the inorganic gel former is from about 1 to about 6 percent by weight of the total weight of the water and the inorganic gel former.

16. The method of coating of claim 2, wherein the source of aluminum, the halide activator, and the oxide dispersant together are from about 30 to about 70 percent by weight of the mixture of the carrier component, the source of aluminum, the halide activator, and the oxide dispersant.

17. The method of coating of claim 1, wherein the article is a gas turbine airfoil.

18. The method of coating of claim 1, wherein the aluminum-containing coating has a thickness of from about 0.0005 inch to about 0.005 inch.

19. A method of coating, comprising the steps of:
  providing a gas turbine airfoil having an internal passage to be coated;
  providing a coating slurry comprising a mixture of
    a carrier component comprising water and a clay selected from the group consisting of a hectorite clay and a bentonite clay, and mixtures thereof,
    a source of aluminum,
    a halide activator, and
    an oxide dispersant;
  applying the coating slurry to the internal passage of the gas turbine airfoil; thereafter
  drying the coating slurry on the internal passage of the gas turbine airfoil to remove the water therefrom; thereafter
  heating the gas turbine airfoil with the coating slurry thereon to form an aluminum-containing coating bonded to the internal passage of the gas turbine airfoil; and thereafter
  removing excess coating material from the internal passage of the gas turbine airfoil.

* * * * *